Feb. 28, 1939.   G. F. RYAN   2,148,506
REPRODUCING MACHINE
Filed Oct. 14, 1937    11 Sheets-Sheet 5
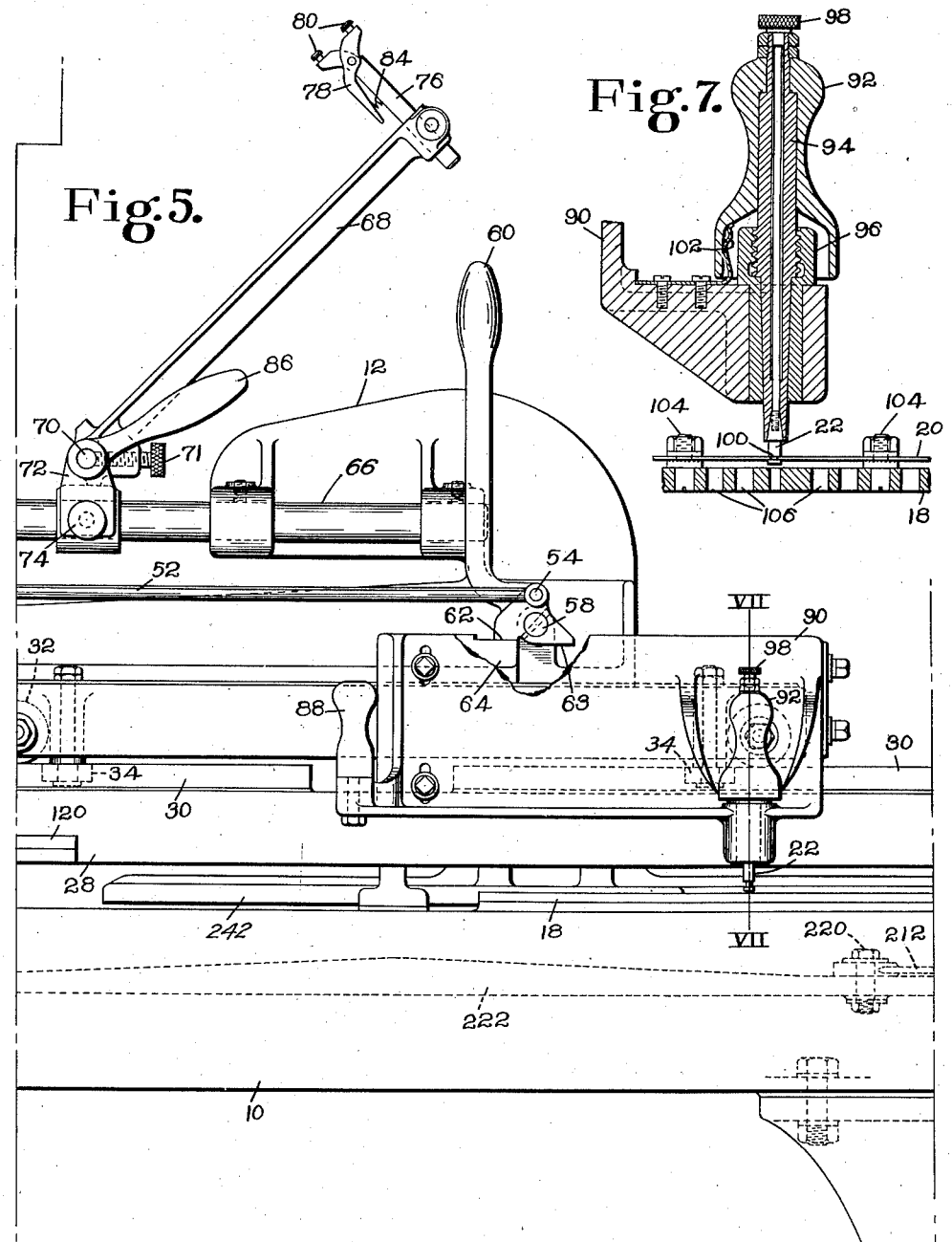
INVENTOR
George F. Ryan
By his Attorney
Harlow M. Davis Feb. 28, 1939.   G. F. RYAN   2,148,506
REPRODUCING MACHINE
Filed Oct. 14, 1937   11 Sheets-Sheet 6
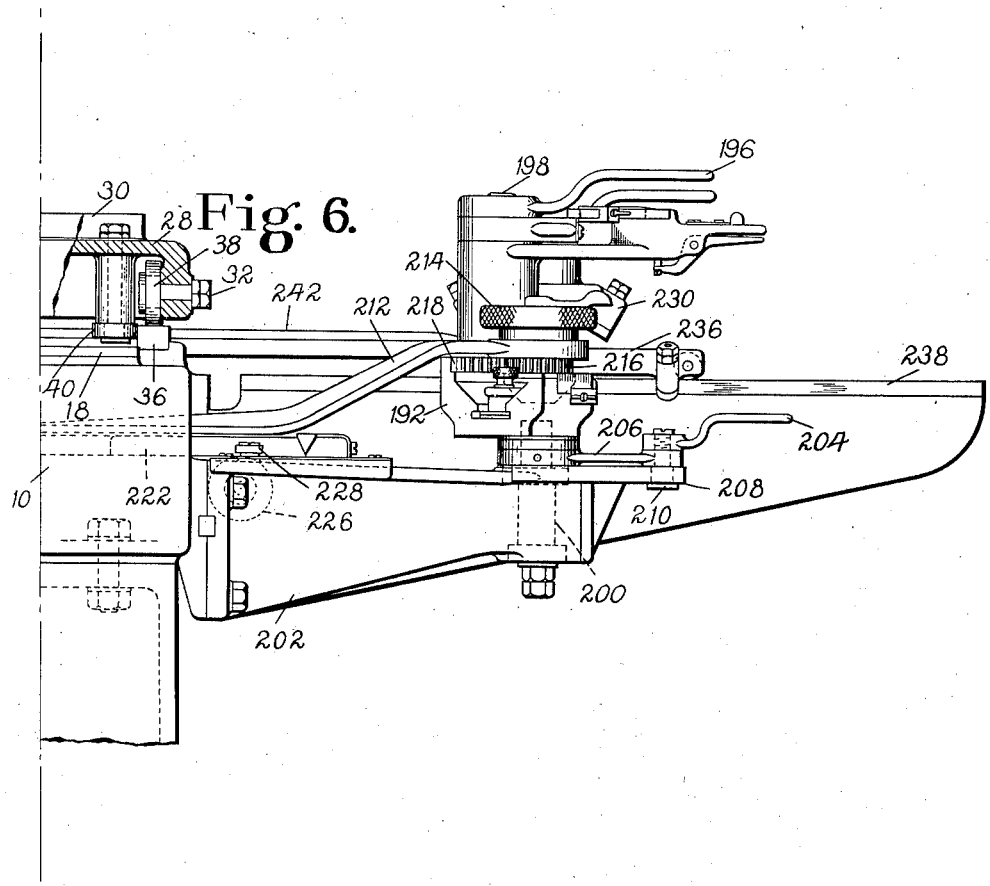
INVENTOR
George F. Ryan
By his Attorney
Harlow M. Davis Feb. 28, 1939.  G. F. RYAN  2,148,506
REPRODUCING MACHINE
Filed Oct. 14, 1937  11 Sheets-Sheet 7

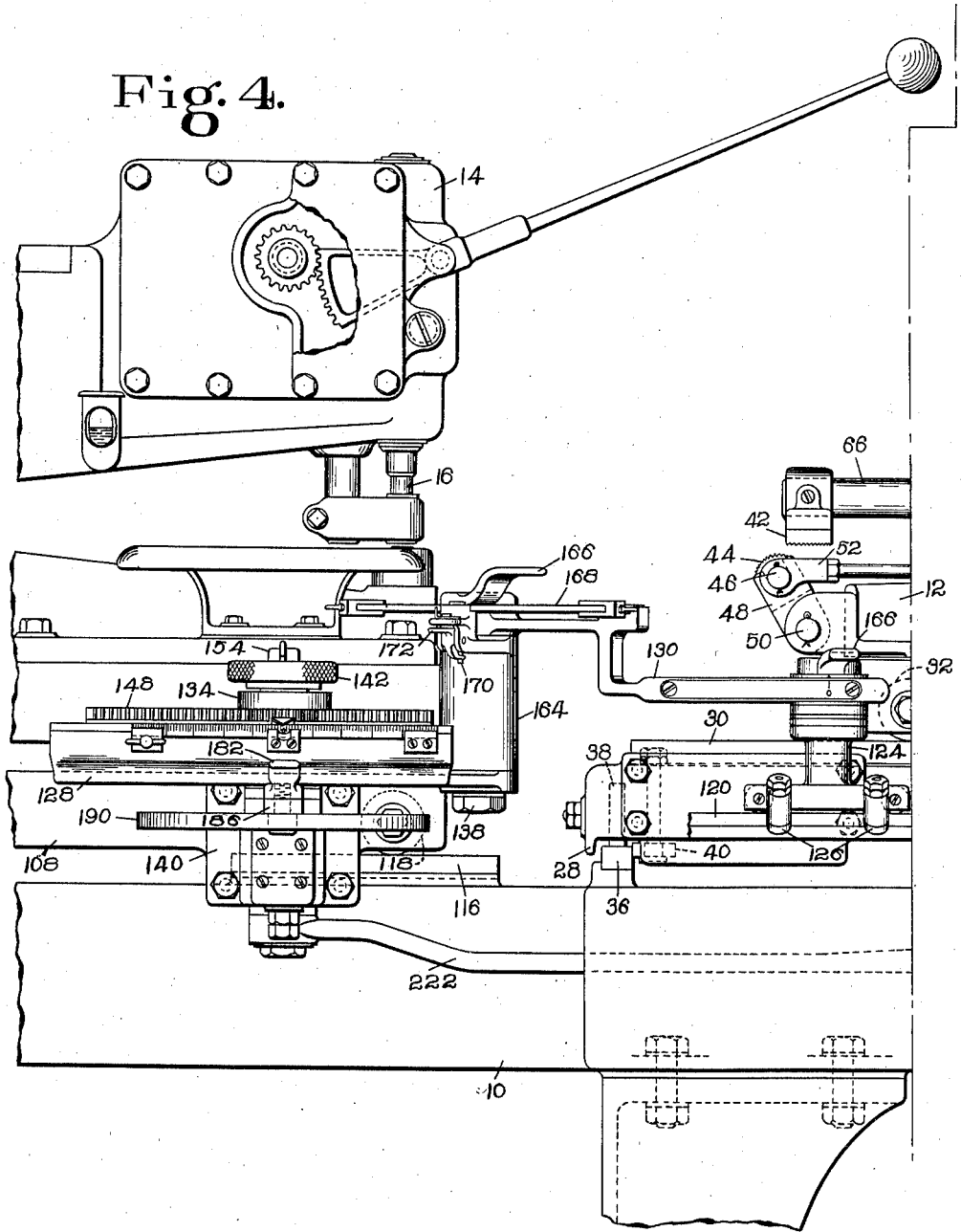

INVENTOR
George F. Ryan
By his Attorney
Harlow M. Davis

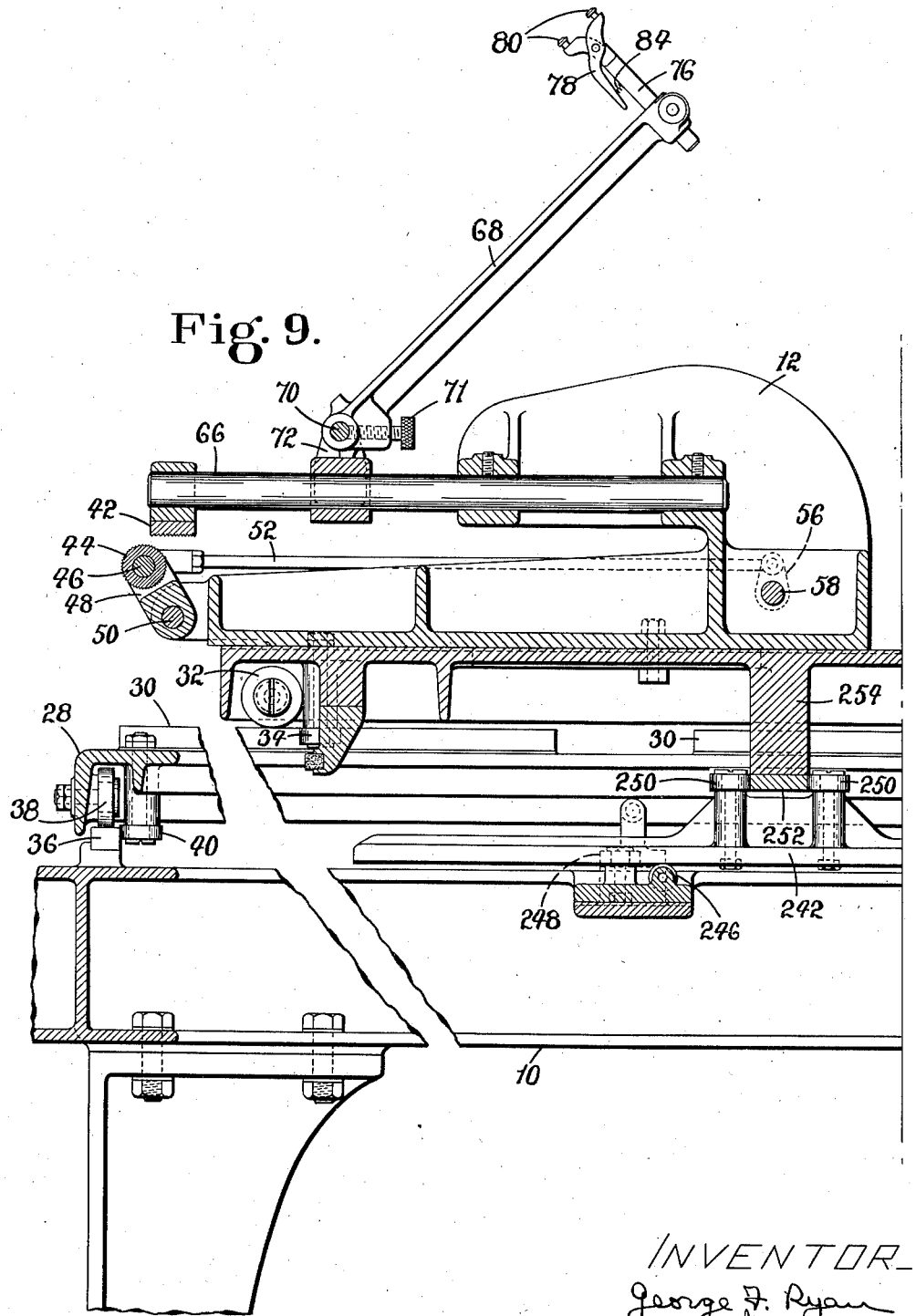

Feb. 28, 1939.  G. F. RYAN  2,148,506
REPRODUCING MACHINE
Filed Oct. 14, 1937   11 Sheets-Sheet 9

INVENTOR
George F. Ryan
By his Attorney
Harlow B. Davis

Feb. 28, 1939. G. F. RYAN 2,148,506
REPRODUCING MACHINE
Filed Oct. 14, 1937 11 Sheets-Sheet 10
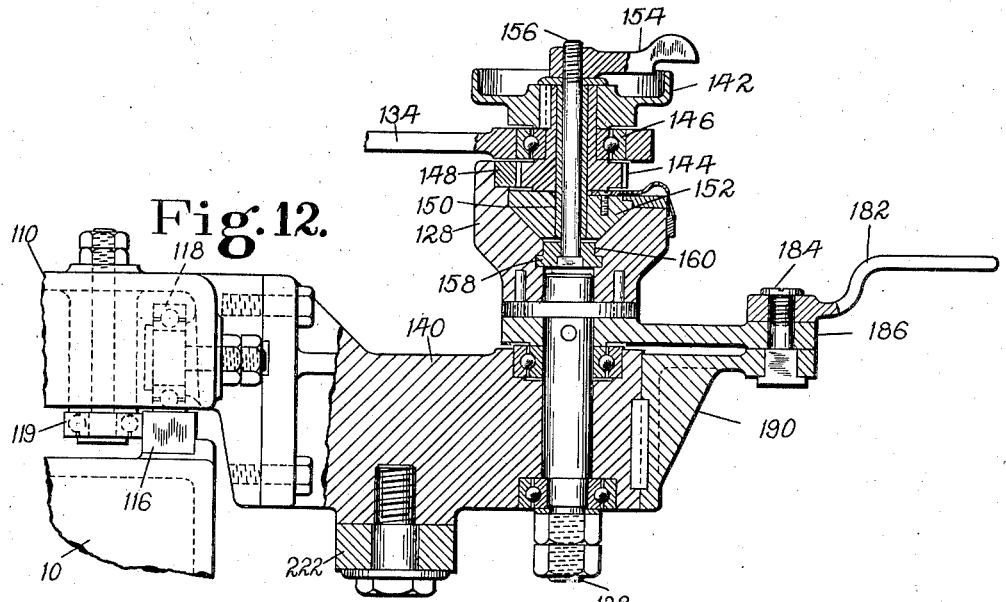
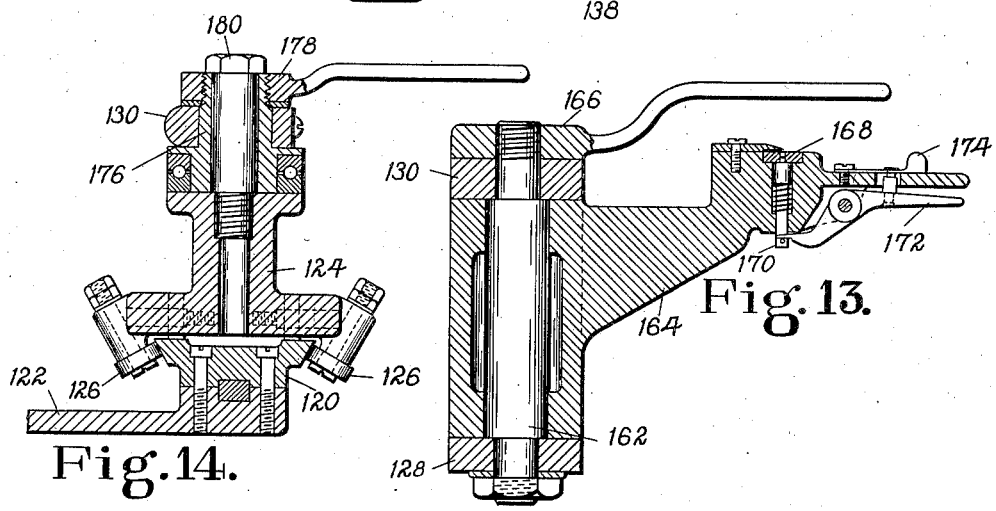
INVENTOR
George F. Ryan
By his Attorney
Harlow M. Davis Feb. 28, 1939.  G. F. RYAN  2,148,506
REPRODUCING MACHINE
Filed Oct. 14, 1937    11 Sheets-Sheet 11

INVENTOR
George F. Ryan
By his Attorney
Harlow M. Davis

Patented Feb. 28, 1939

2,148,506

UNITED STATES PATENT OFFICE 2,148,506

REPRODUCING MACHINE

George F. Ryan, Peabody, Mass., assignor to United Shoe Machinery Corporation, Paterson, N. J., a corporation of New Jersey Application October 14, 1937, Serial No. 168,929

9 Claims. (Cl. 33—23)

This invention relates to reproducing machines and is herein illustrated as embodied in a pattern grading machine of the "two dimensional" kind for producing shoe upper patterns from a model.

Machines of this type, of which that disclosed in Letters Patent of the United States No. 1,998,499, granted April 23, 1935, upon an application of Foster and Colby, is an example, commonly comprise four primary instrumentalities, viz., a model holder, a work holder, a model follower and a cutting or marking tool. These instrumentalities are interconnected by pantographic grading mechanisms which operate, depending upon their adjustment, to cause the tool to form a pattern which is the same size as the model or a generally similar enlargement or diminution of the model.

In order to maintain the same general appearance in a series of patterns of different sizes and widths, it is desirable that their elements be proportionately spaced. Such a procedure does not lend itself well to the cutting of shoe upper parts corresponding to such a series of patterns by the use of dies because of the prohibitive cost of dies in such number as would be necessary to cut a complete run of sizes and widths.

Accordingly, with some kinds and conditions of work, certain elements (e. g., cut-out portions, or tip vamp and quarter lines) of the model are commonly graded so as to be proportionately spaced lengthwise of the pattern, but these elements themselves are reproduced in the patterns exactly as they appear in the model so that one die will suffice for cutting many different sizes of shoe parts made from a family of such patterns. This latter procedure is called "center grading" because it produces the same result as is obtained with the grading mechanism set on center as for grading at a 1:1 ratio.

If the point on the pattern at which it is desired to begin the center grading is located at the grading center of the machine (a point such that when the model follower is located upon it the grading mechanism settings can be altered without causing any relative movement of the tool and work), it is apparent that a change in the grading mechanism between the center grading setting and any other setting, or vice versa, can be effected without causing a jog in the pattern being formed. However, it is often difficult to position the pattern in this manner, even with regard to one line to be center graded, so as to avoid a jog in the work which normally would result from changing the setting of the grading mechanism, and in the practice of this method in connection with a model having a number of lines or elements to be center graded and distributed over its area this difficulty is greatly aggravated.

The general object of the present invention is to provide, in a pattern grading machine, improved means for overcoming the difficulties above indicated.

Accordingly, the invention provides, in a grading machine of the type above mentioned and in which the grading movement is obtained by a relative movement between the tool and the model follower, the latter and the work being arranged to move together, means for inhibiting any grading movement of the tool relatively to the work at any time during the grading operation, whereupon any further movement of the work with respect to the tool while the latter is fixed will be exactly like the relative movement between the model guide and the model, thereby effecting a grading action at a 1:1 ratio without necessitating any change in the setting of the pantographic mechanism.

Conveniently this control of the tool may be obtained, according to another aspect of the invention, by the provision of means for holding immovable, as to the direction in which it is desired to center grade, a part of the above-mentioned pantographic mechanism which controls the tool while the center grading operation is being carried out.

Another object of the invention is to provide an improved work holder by the use of which the positioning of relatively heavy pattern material, such as sheet iron, between successive pattern forming operations is facilitated.

To this end, the present invention provides a work holder having a rolling work-supporting member over which the work may be easily moved and which is adapted to be swung while in engagement with the work to clamp the latter in the holder. During this movement of the work-supporting member it rolls freely against the work, whereby any tendency of the work to be displaced owing to such movement of the work-supporting member is avoided.

These and other features of the invention comprising certain combinations and arrangements of parts will be apparent from the following description of the illustrated embodiment of the invention shown in the drawings, in which—

Figs. 4, 5 and 6 are views in front elevation of successive portions of the machine corresponding approximately to those illustrated in Figs. 1, 2 and 3, respectively.

Fig. 7 is a section taken along the line VII—VII of Fig. 5 through the model follower;

Fig. 9 is a sectional front elevation, the section being taken along the line IX—IX of Fig. 8;

Fig. 12 is a section taken along the line XII—XII in Fig. 1;

Fig. 13 is a section taken on the line XIII—XIII in Fig. 1;

Fig. 14 is a section taken on the line XIV—XIV in Fig. 2; and

Figure 1:
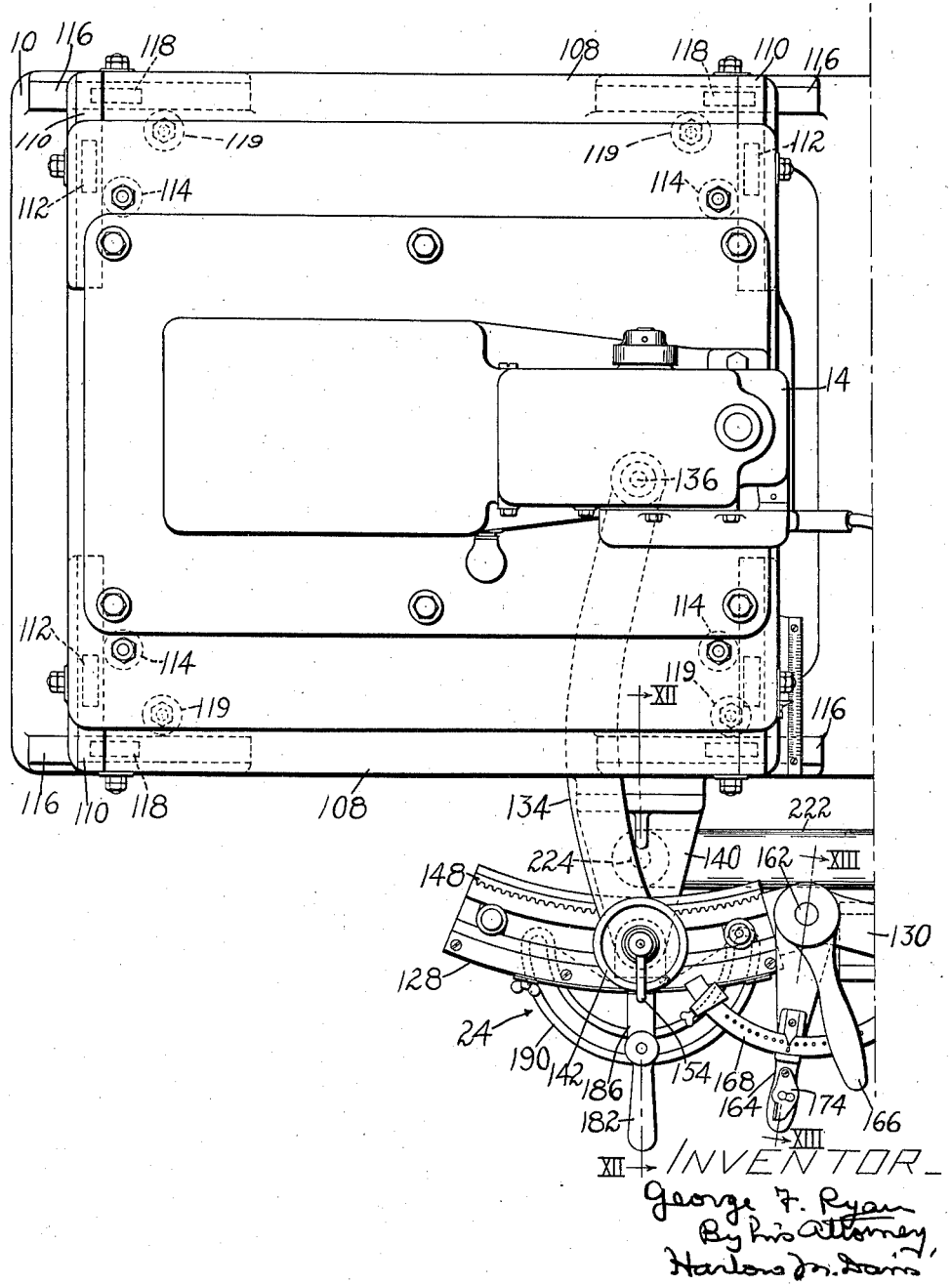
Figs. 1, 2 and 3 are plan views illustrating successive portions of the machine extending from left to right.

The illustrated machine comprises a frame 10 upon which are mounted for movement, independently of each other in mutually perpendicular directions, a work support 12 and a tool head 14, the latter of which is constructed like the tool head forming the subject-matter of copending application Serial No. 168,943, filed October 14, 1937, in the name of E. Ashton. The tool head 14 includes a rapidly reciprocating punch 16 which is adapted to cut a pattern from a piece of sheet material held by the work holder 12, but it is to be understood that the invention may also have application in a machine in which a scriber is used as the tool.

Figure 3:
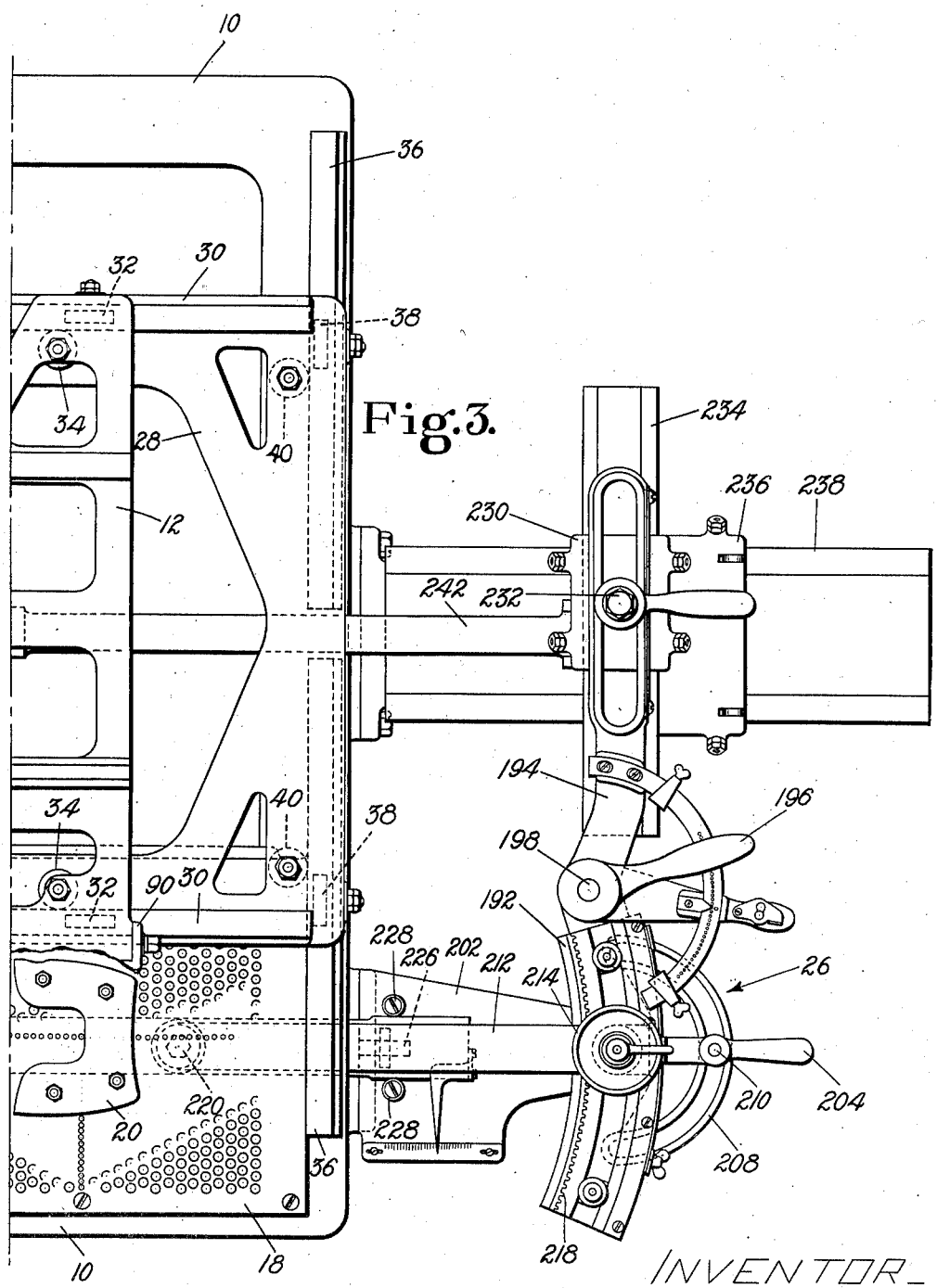

Fixed on the frame 10 is a holder 18 (Figs. 5 and 7) for a model 20 about the periphery of which a model follower 22 associated with the work holder 12 is adapted to be moved to effect a relative feeding movement between the work and the tool 16. This relative movement between the work and the tool, as to its components extending in a north-and-south direction (crosswise of the machine), is controlled by a width grading mechanism 24 (Fig. 1), and similarly a length grading mechanism 26 (Fig. 3) is provided for controlling the relative movement between the work and the tool in an east-and-west direction. As will be more fully explained below, the grading mechanisms 24 and 26 may be adjusted to grade lengthwise and widthwise by enlargement, diminution, or by a 1:1 ratio.

The work holder 12 is mounted to move in an east-and-west direction with respect to a carriage 28 having ways 30 on which run rolls 32 which are rotatably mounted on the base of the work holder 12 adjacent to its corners. In order to prevent any movement of the work holder 12 laterally of the ways 30 rolls 34 mounted on the work holder 12 adjacent to the rolls 32 are arranged to engage the inner sides of the ways 30. The carriage 28 is arranged to move in a north-and-south direction on ways 36 on the frame 10, the carriage 28 also having rolls 38 which run along the ways 36. The carriage 28 is also provided with rolls 40 arranged to engage the inner sides of the ways 36, thereby preventing any movement of the carriage 28 except in a north-and-south direction. It will now be apparent that the work holder 12 may be moved freely in any direction, thereby enabling the operator to trace the periphery of the model 20 with the follower 22 and to move the work in a path conforming exactly to the shape of the model. Thus, if the tool head 14 is held stationary the model will be center graded.

Figure 2:
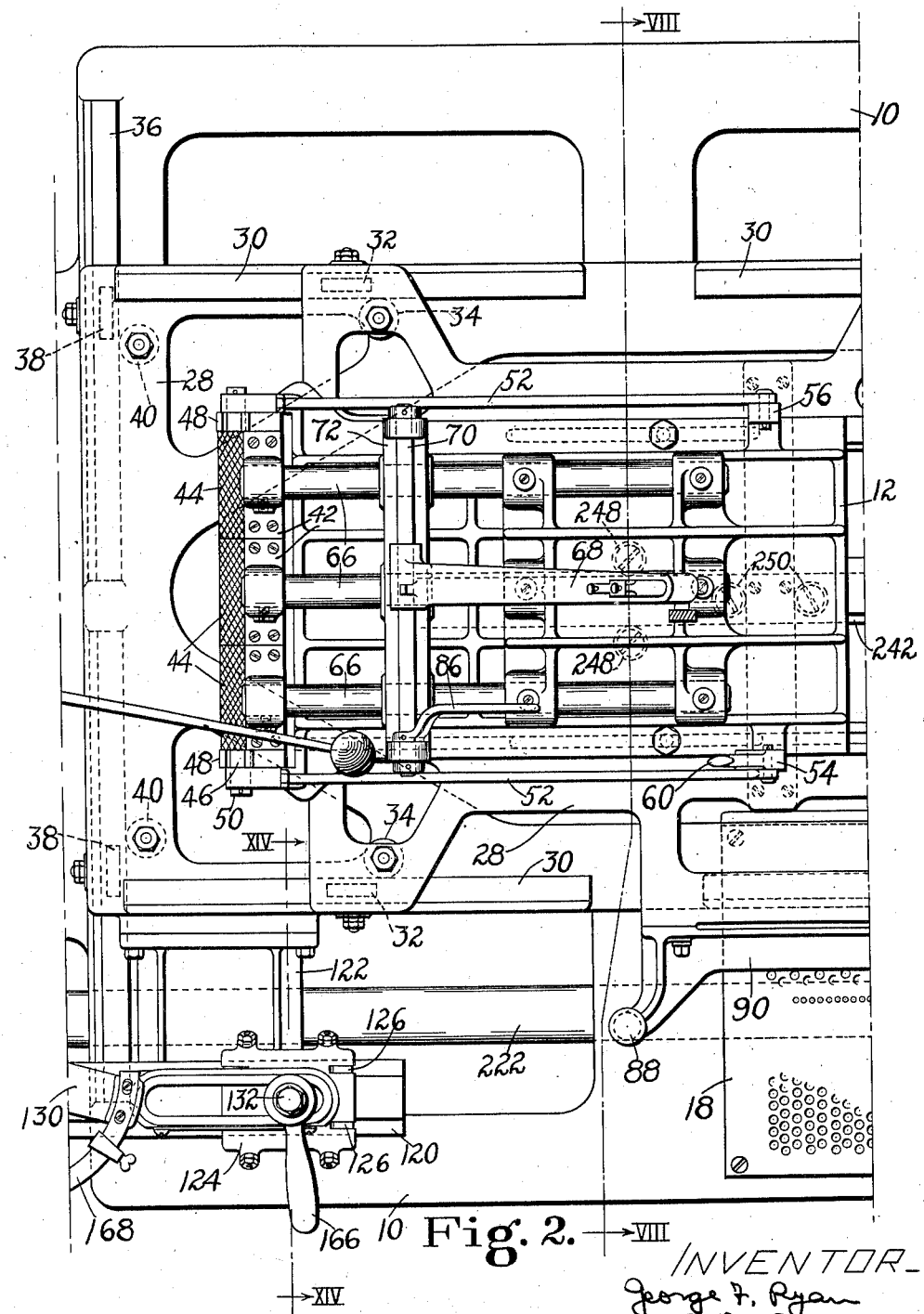
Figure 11:
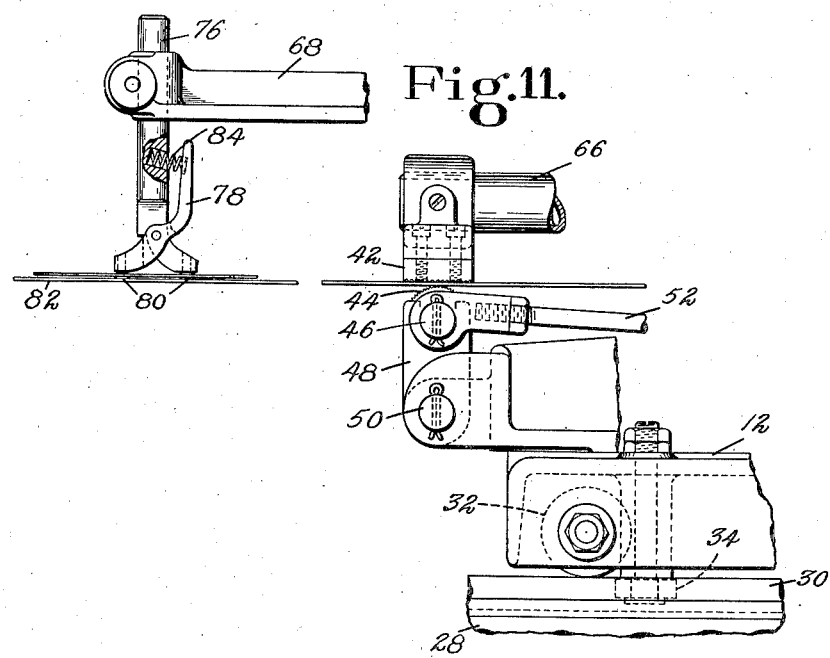
Fig. 11 is a view in elevation illustrating details of the work holder and pattern indicator.

The work (usually in the form of a piece of sheet material) from which a pattern is to be formed is held between knurled clamp plates 42 and rolls 44 (Figs. 2, 4 and 11), the latter being rotatably mounted on a shaft 46 the ends of which are mounted in links 48 pivoted on a rod 50 carried by the work holder 12. The links 48 are adapted to be swung simultaneously in a clockwise direction by connections comprising links 52 pivoted to the shaft 46 and also pivoted at their opposite ends to cranks 54, 56 (Figs. 2 and 5) which are fixed to a shaft 58 rotatably mounted in the base of the holder 12. The crank 54 is provided with an operating handle 60 the movement of which is limited by the engagement of shoulders 62, 63 on the crank with a stop 64 on the holder 12. Clockwise movement of the handle 60 causes a similar movement of the links 48 until they assume a vertical position, when the shoulder 63 will engage the stop 64. During the latter part of this movement, after the work has been moved firmly into engagement with the plates 42, the latter are permitted to yield upwardly by the yielding of rods 66 on which the plates 42 are mounted at one end, the rods being fixed at their other ends in the work holder 12.

In order to indicate how the work must be placed in the work holder so that the punch 16 will not run off an edge of the work, the present machine is provided with an indicator having an arm 68 carried by a shaft 70 and adapted to be fixed in any desired position axially thereof by a set screw 71, the shaft 70 being pivotally mounted on a slide 72 arranged to move lengthwise of the rods 66 and adapted to be clamped thereon in adjusted position by means of a set screw 74. The upper end of the arm 68 is bored to receive a shaft 76 which is axially adjustable in the arm 68 and has pivoted thereto a jaw 78, the extreme ends of the jaw and shaft 76 being provided with shouldered pins 80 adapted to be received in bayonet slots formed in a pattern 82 (Fig. 11) conforming to the shape of the pattern to be cut from the work. A compression spring 84 extending between the jaw 78 and shaft 66 is arranged normally to urge the pins 80 apart so as to hold the pattern 82 firmly but releasably thereon. The arm 68 having been adjusted with respect to the holder 12 by the means described above, it may then be swung downwardly by means of an operating handle 86 fixed to the shaft 70 until the pattern 82 is adjacent to the work piece from which another pattern is to be formed. The handle 60 having been swung to its vertical position, thereby releasing the work, the latter may be adjusted until an uninterrupted area is covered by the pattern 82. Such movement of the work piece in case it is heavy as when sheet iron is used is facilitated by the free rolling action of the rolls 44. Similarly, when the work is clamped against the plates 42 there is substantially no tendency for the work piece to be moved from its adjusted position because the rolls 44 freely turn while in contact with the lower side of the work during the clamping operation.

The work holder 12 may now be moved by the operator to present the work piece to the tool 16. To carry out this operation the operator grasps a handle 88 mounted on a bracket 90 fixed to the holder 12 and moves the latter so as to cause the model follower 22 to trace the periphery of the model 20. Further to insure the proper guidance of the holder 12 in this movement the operator may grasp a handle 92 fixed to a shaft 94 (Fig. 7) which is threaded in a bushing 96 carried by the bracket 90, the shaft 94 having a tapered recess in its lower end adapted to receive the model follower 22. A screw 98 extending axially through a recess in the shaft 94 is threaded into the follower 22 so as to permit the latter to be easily replaced when excessively worn. By turning the holder 92 the heightwise position of the follower 22 may be readily regulated to permit the model 20 to be received in a groove 100 in the follower. A spring 102 fixed to the bracket 90 is arranged to engage the handle 92, as illustrated in Fig. 7, frictionally to hold the handle 92 in whatever position to which it may have been adjusted.

The model 20 is supported by bolts 104 the heads of which are adapted to be received in holes 106 formed in sufficient number in the holder 18 to accommodate all sizes of models.

In the operation of the illustrated machine grading of the model in other than a 1:1 ratio is effected by a grading movement of the tool relatively to the work holder in accordance with the required enlargement or diminution of the pattern with respect to the model. To permit this movement of the tool head 14 it is mounted for movement in a north-and-south direction on a carriage 108 (Fig. 1) having ways 110 on which run rolls 112 rotatably mounted on the base of the tool head 14. Other rolls 114 also carried by the tool head are arranged to engage the inner sides of the ways 110 to prevent any movement of the tool head 14 laterally of the ways 110. The carriage 108 is mounted for movement in the east-and-west direction on the frame 10 which is provided with ways 116 on which run rolls 118 rotatably mounted on the carriage 108. Rolls 119 mounted on the carriage 108 are arranged to engage the inner sides of the ways 116 in order to prevent movement of the carriage laterally of the ways 116.

Thus, the tool head 14, like the work holder 12, is arranged to move freely in mutually perpendicular directions and hence may be moved in any desired direction by a combined movement of the tool head with respect to the carriage 108 and of the carriage with respect to the frame 10. The control of this movement of the tool head, which results in a pattern differing in size from the model and which is referred to herein as grading movement, is effected by the above-mentioned grading mechanisms 24 and 26 now to be described.

The width grading mechanism 24 comprises a dovetailed slideway 120 which is mounted on the carriage 28 parallel to the ways 30 by means of a bracket 122. In order that the width grading mechanism 24 will be actuated only by north-and-south movements of the carriage 28 a slide 124 is arranged to move freely along the slideway 120 on rolls 126. The slide 124 is connected to the tool head 14 by an arcuate grading lever 128 comprising an extension 130 pivoted to the slide at 132 (Fig. 2), and a link 134 (Fig. 1) adjustable at one end along the arcuate lever 128 and pivoted to the tool head base at 136.

The lever 128 is fixed to the upper end of a shaft 138 (Fig. 12) which is rotatably mounted on a bracket 140 fixed to the carriage 108. Adjustment of the link 134 with respect to the lever 128 for the purpose of changing the grading ratio is effected by turning a knob 142 which is keyed to a gear member 144 to which the link 134 is connected by a ball bearing 146 and which meshes with an arcuate rack 148 carried by the lever 128. The gear member 144 is rotatably mounted on a sleeve 150 fixed to a block 152 arranged to slide in an arcuate slot in the lever 128 having a radius equal to the effective length of the link 134. The link 134 may be clamped in any desired position with respect to the lever 128 by a nut 154 threaded on a bolt 156 the head of which is received in a washer 158 arranged to slide with the block 152 in a T-shaped recess 160 in the lever 128.

The grading lever 128 and its extension 130 are connected by mechanism known as a "shift" which serves the purpose of throwing the tool north or south in order to cause a discontinuity in the pantographic characteristic of the grade in this direction. Such mechanism has long been used to cut off an unwanted portion of the pattern along its top line in such cases as when a wide pattern is regularly width graded and the top line would otherwise be too high to look well. This shift also serves as a lost-motion device for the purpose of preventing cramping of the grading mechanism when the machine is used to center grade, as will be described below. The shift comprises a stud 162 (Figs. 1 and 13) fixed to the lever 128 and carrying an arm 164 also fixed with respect to the lever 128. Normally the extension 130 is clamped firmly against the arm 164 by a clamp 166 threaded on the upper end of the stud 162, but when the clamp 166 is released the lever 128 and extension 130, under certain conditions as will be pointed out below, may freely pivot with respect to each other about the axis of the stud 162. The angular relation between the lever 128 and the extension 130 may be adjusted by predetermined increments by the cooperation of a perforated arcuate member 168 fixed to the extension 130 and a spring-pressed pin 170 carried by the arm 164 and adapted to be received in any of a number of holes in the member 168. The pin 170 may be moved away from the member 168 by a lever 172 which may be locked in its inoperative position by a catch 174 mounted to swing on the arm 164.

The portion of the extension 130 remote from the shift is slotted to receive a sleeve 176 (Fig. 14) on the upper end of which is threaded a clamp 178 for securing the extension 130 to the sleeve in any desired position. By this adjustment it is possible to vary the grading ratio independently of the setting of the link 134. The sleeve 176 is mounted to rotate freely with respect to the slide 124 on a stud 180 threaded into the slide.

Suppose now that a point has been reached on the model periphery from which it is desired to center grade the model in the north-and-south direction (at a 1:1 ratio) for a certain distance. The operator will first operate a clamp 182 (Figs. 1 and 12) threaded on a bolt 184 carried by an arm 186 fixed to the shaft 138 in order to hold the lever 128 immovable with respect to the bracket 140. To this end, the clamping action of the clamp 182 and bolt 184 causes the arm 186 to be firmly held against an extension 190 of the bracket 140 having an arcuate slot adapted to receive the bolt 184. The lever 172 is then swung into its inoperative position and held therein by the latch 174 whereby the pin 170 is moved away from the element 168. The clamp 166 is then loosened and hence permits a free pivotal movement of the extension 130 about the stud 162 so as to permit the work holder 12 to be moved freely in the north-and-south direction without cramping of the grading mechanism 24. Because the arm 186 is clamped against the extension 109 this procedure causes no disturbance of the machine which would result in a jog in the work and its reversal will set the machine back into the width grade for which it was originally set without disturbance.

Figure 8:
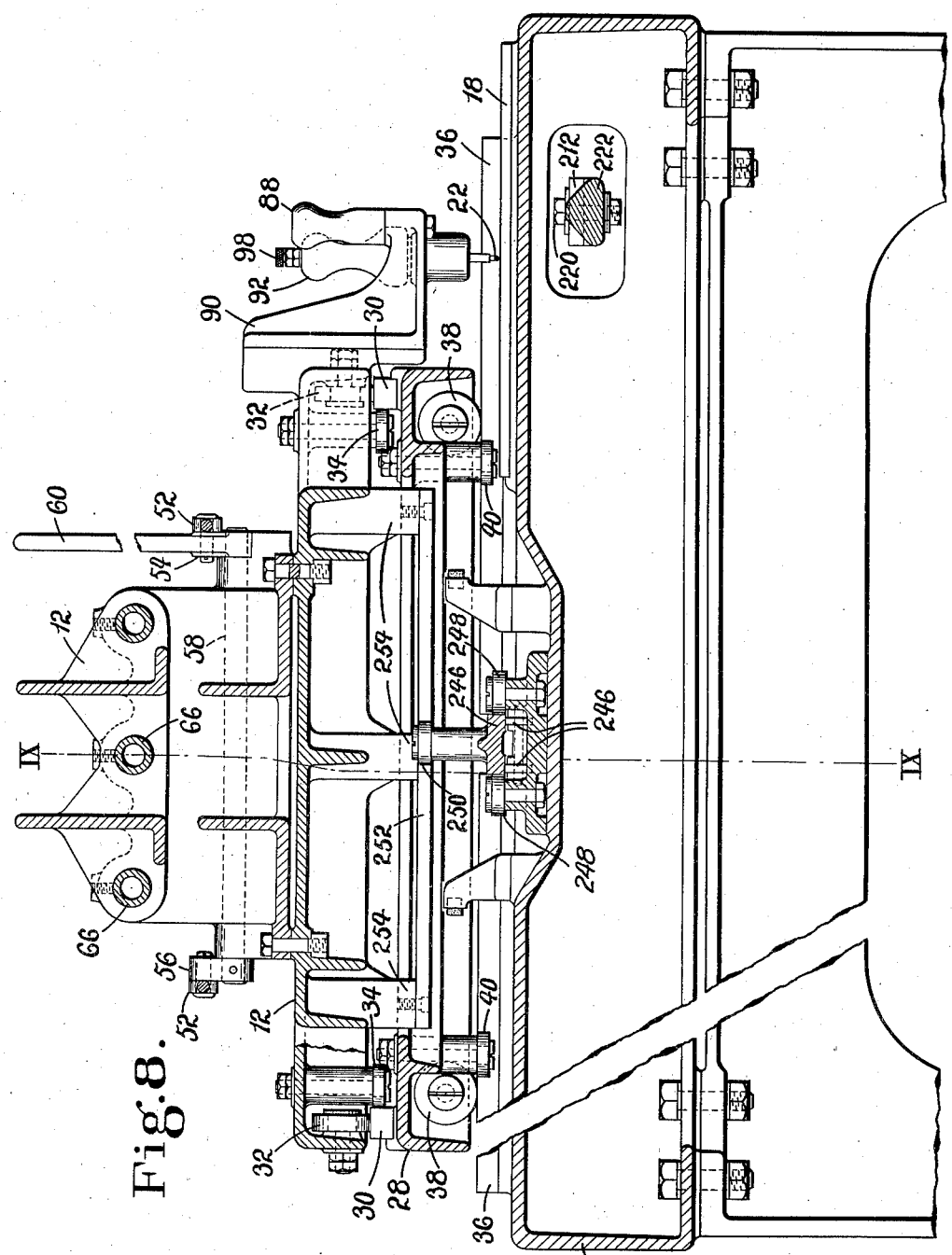
Fig. 8 is a section taken along the line VIII—VIII in Fig. 2.
Figure 10:
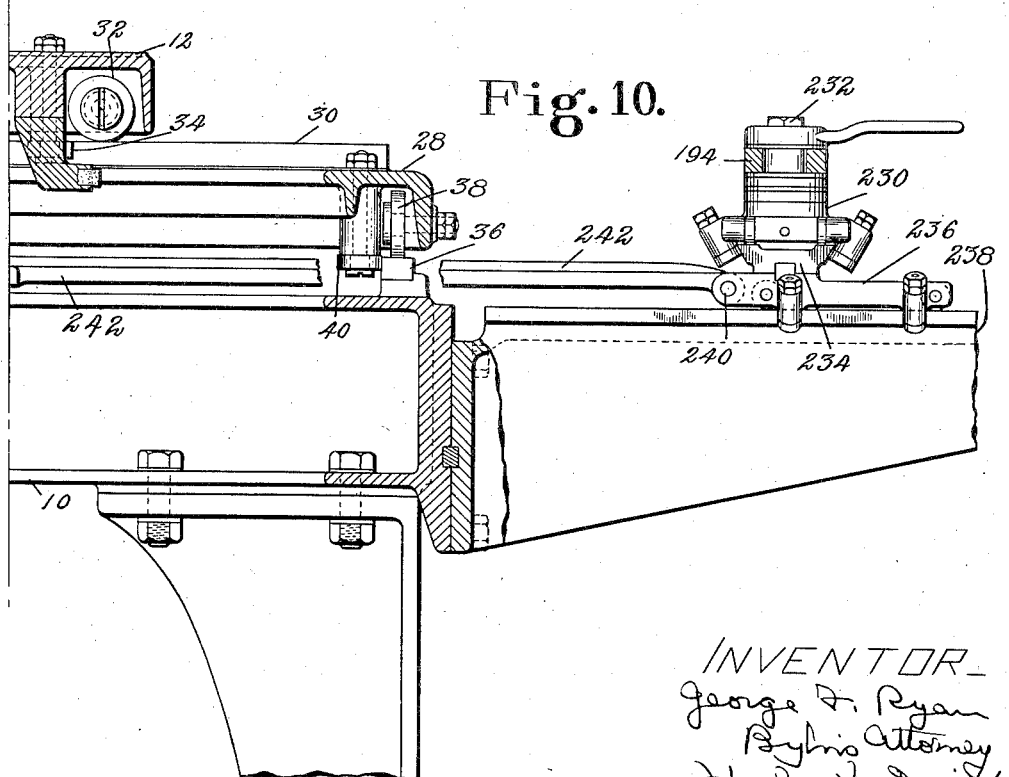
Fig. 10 is a sectional elevation illustrating a part of the structure of Fig. 6.
Figure 15:
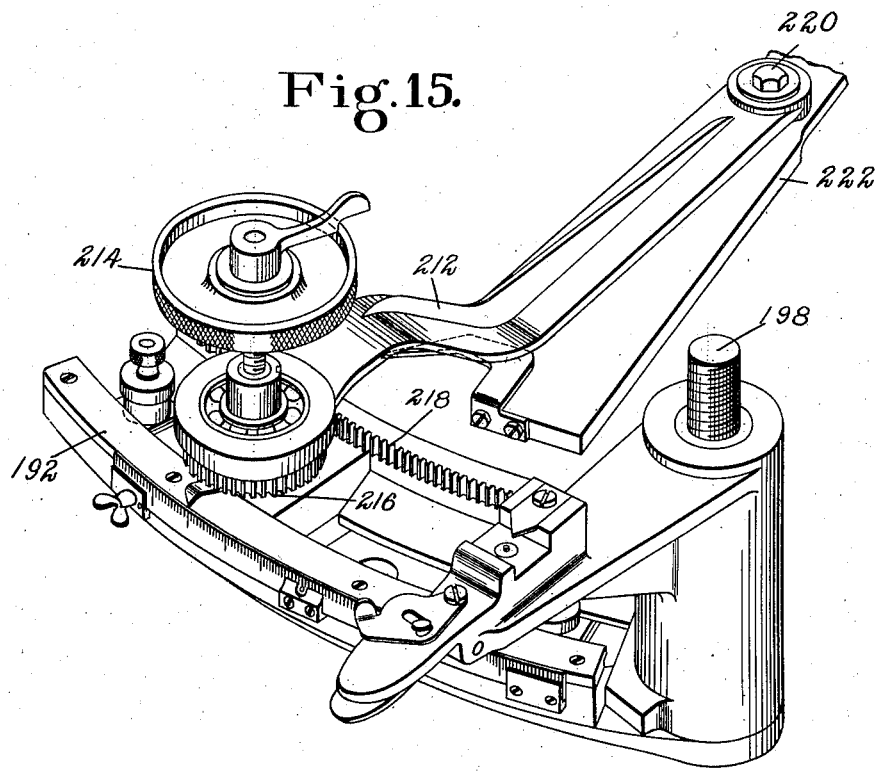
Figs. 15 and 16 are perspective views of the part of the grading mechanism illustrated in Figs. 3 and 6.
Figure 16:
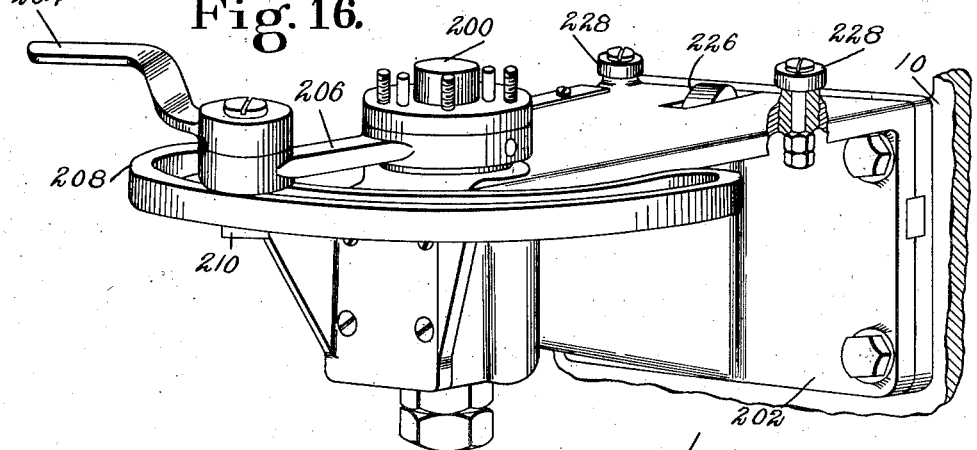

The length grading mechanism 26 is arranged to control the grading movement of the tool head 14 in an east-and-west direction and is constructed generally like the width grading mechanism 24 just described. The grading mechanism 26 comprises a grading lever 192 (Fig. 3) having a slotted extension 194 between which is arranged a shift including a clamp 196 which normally holds the lever and extension together but which may be loosened to permit them to pivot at 198. The lever 192 is carried by a shaft 200 (Figs. 6 and 16) rotatably mounted in a bracket 202 fastened to the frame 10 and is adapted to be held immovably with respect to the bracket by a clamp 204 carried by an arm 206 which is fixed to the shaft 200 and adapted to be held firmly against an extension 208 of the bracket 202 having an arcuate slot through which extends a bolt 210 on which the clamp 204 is threaded. The lever 192 is connected to the tool head 14 by connections comprising a link 212 the length of which is equal to the radius of curvature of the lever 192 and may be adjusted at its outer end with respect to the latter, by turning a wheel 214 which actuates a gear 216 arranged to mesh with a rack 218 fixed on the lever, in the same manner in which the corresponding parts operate, as described in connection with the width grading mechanism 24. The link 212 is pivoted at 220 (Figs. 3, 5 and 15) to a bar 222 connected at one end at 224 (Fig. 1) to the bracket 140 and supported at its other end for movement in an east-and-west direction by a roll 226 (Figs. 3, 6 and 16) rotatably mounted in the bracket 202. The bar 222 is guided laterally adjacent to the roll 226 by rolls 228 adapted to engage the sides of the bar. The lever 192 is operated whenever the work holder 12 is moved in a direction having an east-and-west component by connections comprising a slide 230 to which the extension 194 is pivoted at 232 and which is mounted to roll freely on a slideway 234 carried by a slide 236 mounted to move freely in an east-and-west direction on a dovetailed slideway 238 fixed on the frame 10. The slide 236 is connected at 240 (Fig. 10) to a bar 242 the inner end of which is supported on rolls 246 (Fig. 8) for movement in an east-and-west direction and is guided laterally in this movement between rolls 248, all of which rolls are rotatably mounted on the frame 10. In order that only east-and-west movements of the carriage 12 will be imparted to the bar 242 the latter also has rotatably mounted thereon rolls 250 arranged to engage opposite sides of another bar 252 extending in a north-and-south direction and fixed to the lower ends of elongated bosses 254 extending downwardly from the work holder 12. It will now be apparent that north-and-south components of the movement of the work holder 12 will be ineffectual to operate the length grading mechanism 26 since the bar 252 during any of such movements will move freely between the rolls 250. However, any east-and-west component of the movement of the work holder 12 will be fully transmitted to the slide 236.

When it is desired to change the length grade to a 1:1 ratio without changing the position of the link 212 with respect to the lever 192, the clamp 204 is operated to hold the lever 192 immovable with respect to the bracket 202 and the shift at 198 is released, as in the case of the width grading mechanism 24 described above, in order to prevent cramping of the length grading mechanism 26. Thus, center grading in both length and width independently at any desired point in the production of the work-piece is obtainable without disturbance of the machine at the points of transition from one grade to another.

Having described my invention, what I claim as new and desire to secure by Letters Patent of the United States is:

1. In a pattern reproducing machine, four primary instrumentalities, namely, a model holder, a work holder, a model follower and a tool, mechanism interconnecting said work holder and tool for effecting relative grading movements therebetween in perpendicular directions to reproduce a model in a work-piece, said mechanism comprising a link connected to said tool, a member connected to said work holder, and a lever connecting said link and said member, means for holding said link immovable as to the direction in which it is desired to effect center grading, and a lost-motion device operable to prevent cramping when said link is so held.

2. In a pattern reproducing machine, four primary instrumentalities, namely, a model holder, a work holder, a model follower and a tool, said tool and work holder being relatively movable to form a pattern graded from said model, grading mechanism comprising a lever and members connecting said lever with said tool and work holder, means for holding one of said members immovable in order to effect center grading, and a lost-motion means in said mechanism operable to prevent cramping when said last-mentioned member is held immovable.

3. In a pattern grading machine, four primary instrumentalities, namely, a model holder, a work holder, a model follower and a tool, said tool and work holder each being movable in mutually perpendicular directions, grading mechanism comprising a lever and members connecting said lever with said tool and said work holder means cooperating with said mechanism to hold said tool immovable in order to effect center grading, and a lost-motion device operable when the tool is so held, to prevent cramping of said mechanism.

4. In a pattern grading machine, four primary instrumentalities, namely, a model holder, a work holder, a model follower and a tool, mechanism interconnecting said work holder and tool for effecting a relative grading movement therebetween to reproduce a model in a work-piece, said mechanism comprising a lever mounted to pivot about a fixed axis and members connecting said lever with said tool and work holder, means for rigidly clamping said lever to prevent movement of said tool, and a normally rigid joint in said lever operable to permit movement of said work holder when said lever is so clamped.

5. In a pattern grading machine, four primary instrumentalities, namely, a model holder, a work holder, a model follower and a tool, mechanism interconnecting them for effecting relative grading movement between said tool and work holder to reproduce a model pantographically in a work-piece, said mechanism comprising a lever and members connecting said lever with said tool and work holder, said lever comprising normally rigid jointed sections one of which is mounted to oscillate about a fixed axis, means for immovably clamping said oscillating section when it is desired to center grade, and means operable to permit relative movement between said sections when one is so clamped whereby cramping of said mechanism is prevented.

6. In a pattern reproducing machine, four primary instrumentalities, namely, a model holder, a work holder, a model follower and a tool, said tool and said work holder each being movable in different directions, grading mechanism interconnecting said work holder and tool for effecting grading movement of said tool relatively to said work holder in said directions, said mechanism comprising plural means each of which includes a lever mounted to pivot about a fixed axis and members connecting said lever with said tool and work holder, means cooperating with said levers to hold said tool immovable in order to effect center grading, and normally rigid pivoted joints in said levers operable to prevent cramping of said mechanism when said tool is held immovable.

7. In a pattern reproducing machine, a work holder comprising a clamp plate, a member mounted normally to support a work-piece thereon adjacent to said plate, and means for moving said member toward said plate to cause the work to be gripped therebetween, said member also being mounted to roll against the work during its movement toward said plate thereby to prevent displacement of the work.

8. In a pattern reproducing machine, a work holder comprising a yieldingly mounted plate, a work supporting roll mounted for movement toward said plate thereby to cause said plate to yield in response to the pressure thereagainst of a work-piece on said roll, and means for limiting the movement of said roll.

9. In a pattern reproducing machine, a work holder comprising a clamp plate, a work supporting member, a carrier on which said member is mounted to rotate freely, said carrier being mounted to swing toward and away from said plate, and means for swinging said carrier.

GEORGE F. RYAN.